US011797681B2

(12) United States Patent
Poulard et al.

(10) Patent No.: US 11,797,681 B2
(45) Date of Patent: Oct. 24, 2023

(54) FAST AND VERSATILE MULTICORE SOC SECURE BOOT METHOD

(71) Applicant: NXP USA, Inc., Austin, TX (US)

(72) Inventors: Fabrice Poulard, Houilles (FR); Marius Rotaru, Haar (DE); Sören Heisrath, Kaltenkirchen (DE)

(73) Assignee: NXP USA, Inc., Austin, TX (US)

( * ) Notice: Subject to any disclaimer, the term of this patent is extended or adjusted under 35 U.S.C. 154(b) by 235 days.

(21) Appl. No.: 17/341,604

(22) Filed: Jun. 8, 2021

(65) Prior Publication Data
US 2021/0406380 A1 Dec. 30, 2021

(30) Foreign Application Priority Data
Jun. 30, 2020 (EP) .................................. 20305732

(51) Int. Cl.
*G06F 15/177* (2006.01)
*G06F 9/00* (2006.01)
*G06F 21/57* (2013.01)
*G06F 12/14* (2006.01)

(52) U.S. Cl.
CPC ........ *G06F 21/575* (2013.01); *G06F 12/1416* (2013.01); *G06F 2212/1052* (2013.01); *G06F 2221/034* (2013.01)

(58) Field of Classification Search
CPC ... G01R 31/40; G06F 1/28; G06F 1/30; G06F 1/26; G06G 7/10; H02H 1/0007; H02H 7/20
See application file for complete search history.

(56) References Cited

U.S. PATENT DOCUMENTS

| 7,725,703 | B2 | 5/2010 | Hunter et al. |
| 8,028,172 | B2 | 9/2011 | Hunter et al. |
| 11,023,587 | B2* | 6/2021 | Oster ...................... G06F 21/78 |
| 2008/0244257 | A1* | 10/2008 | Vaid ...................... H04L 9/0827 |
| | | | 713/2 |
| 2015/0379270 | A1* | 12/2015 | Chen ..................... H04L 9/0894 |
| | | | 713/2 |
| 2016/0085545 | A1 | 3/2016 | Togan et al. |
| 2017/0372076 | A1 | 12/2017 | Poornachandran et al. |
| 2018/0276387 | A1 | 9/2018 | Liu et al. |
| 2019/0334702 | A1 | 10/2019 | Heisrath |

(Continued)

OTHER PUBLICATIONS

Intel, "Intel Software Guard Extensions Programming Reference", Ref. 329298-002US, Oct. 1, 2014, retrieved from the internet at https://software.intel.com/sites/default/files/managed/48/88/329298-002.pdf on Jul. 13, 2017, 186 pages.

*Primary Examiner* — Xuxing Chen

(57) ABSTRACT

A system, method, and apparatus are provided for securely controlling operations of a data processing system by activating a security subsystem to control startup behavior of application subsystems, installing SMR parameters which include an initial authenticity proof for use with an initial verification process for the SMR and calculating an alternate authenticity proof for use with a subsequent verification process for the SMR, and then by subsequently verifying the SMR using the alternate authenticity proof for the subsequent verification process applied to the SMR so that the security subsystem can apply a comprehensive system reaction for the application subsystem based on the SMR verification results.

20 Claims, 7 Drawing Sheets

(56) References Cited

U.S. PATENT DOCUMENTS

2020/0104211 A1* 4/2020 Obayashi ............ G06F 11/1417
2020/0159512 A1* 5/2020 Schutt .................... G06F 21/64
2021/0011734 A1* 1/2021 Dang ...................... H04L 9/088

* cited by examiner

FAST AND VERSATILE MULTICORE SOC SECURE BOOT METHOD

BACKGROUND OF THE INVENTION

Field of the Invention

The present disclosure is directed in general to field of data processing. In one aspect, the present disclosure relates to a system for securely activating functionality in a data processing system.

Description of the Related Art

Data processing systems, such as system-on-a-chip (SoC) integrated circuit (IC) systems, are produced with a variety of different configurations, functions, features, and pricing. As the value and use of information processed on such data processing systems continues to increase, individuals and businesses seek additional ways to process and store information. While there are solutions for protecting data integrity in data processing systems, such security solutions typically rely on a hierarchical trust model which requires a sequential initialization of software and hardware during system initialization. In such solutions, the order of execution and initialization corresponds to the level of trust asserted to a given software and/or hardware entity, starting with trusted software and hardware first. Unfortunately, there are numerous design challenges and performance drawbacks associated with conventional security solutions which use security assets, such as keys, to ensure the integrity and authenticity of software and/or hardware operations. First of all, such security assets are typically used for a fraction of a system's run-time (e.g., only during system initialization), so the associated security circuitry and/or operative processing functions are not being efficiently used for such infrequently invoked security operations. And while there are data processing systems which have security subsystems for providing hardware-assisted security relevant services and assets that can be selectively used after an authenticity check of the application firmware (secure boot), such security subsystems typically provide a static security policy that is fixed and unchanging during runtime until the system is powered off or rebooted. As seen from the foregoing, the existing solutions for protecting the integrity of data communications are extremely difficult at a practical level by virtue of the challenges with meeting the performance requirements and cost constraints for securely activating a data processing system functionality that is flexible, yet secure, with low overhead and cost.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
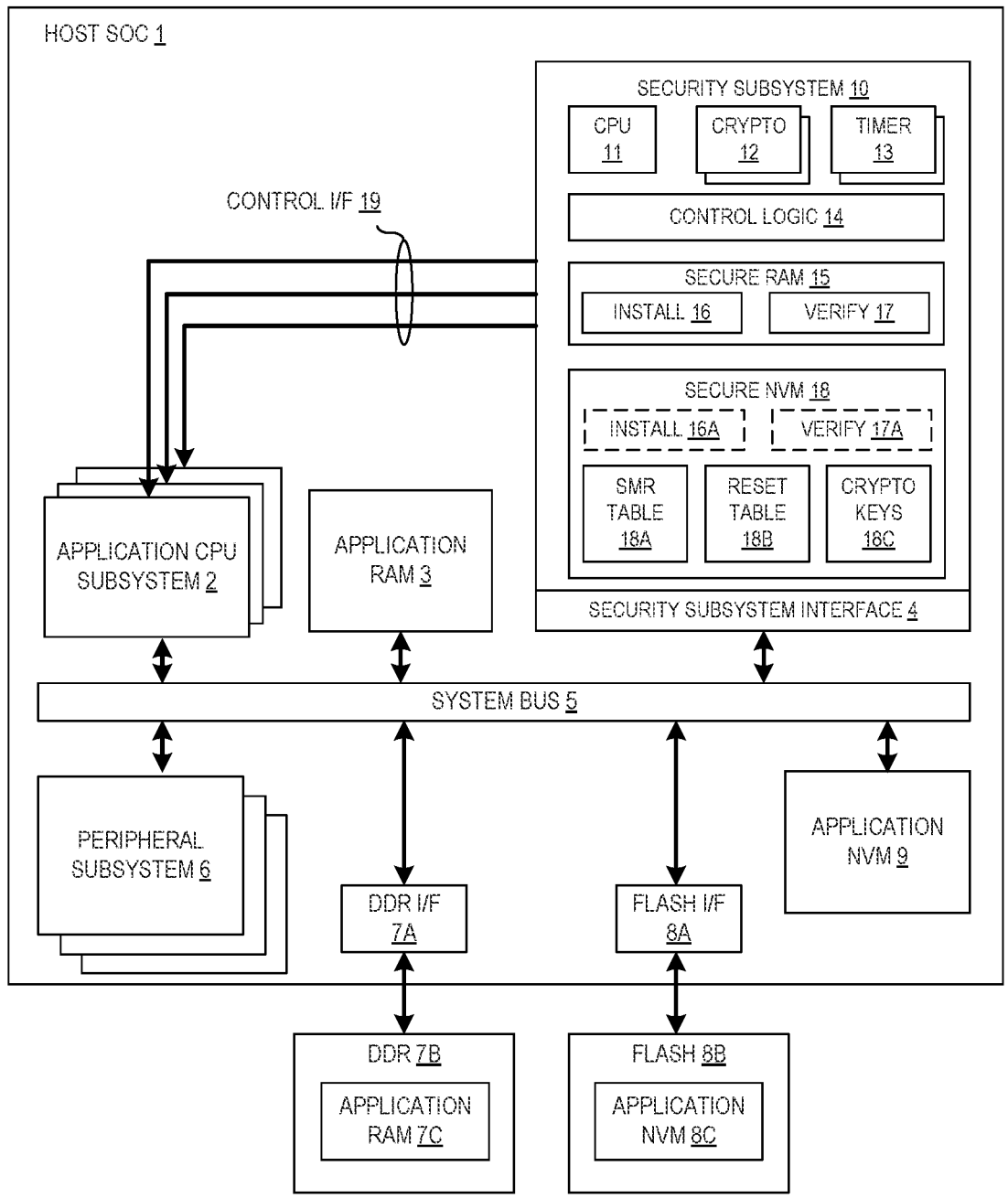
FIG. 1 depicts a simplified top-level system view of a data processing system having a hardware security subsystem which provides a fast and versatile secure boot process in accordance with selected embodiments of the present disclosure.

An apparatus, system, architecture, methodology, and program code are described for an integrated circuit computer system—such as electronic control units (ECUs), microcontrollers (MCUs), power train control modules (PCM), System(s)-on-a-Chip (SoC), and System(s)-in-a-Package (SiP)—which allows fast, versatile and secure boot process to ensure strong authentication of boot codes based on public-key cryptography verification along with authentication of application software during application runtime which can use dynamically configurable and versatile system reactions or sanctions at any given time. As disclosed, the integrated circuit computer system may include a security subsystem having control logic, secure memory, and dedicated crypto processor resources which interact with one or more application subsystems that are prevented from directly accessing security assets at the security subsystem. In this way, the security subsystem is connected and configured to ensure the integrity and authenticity of application subsystem operations and/or to provide access to security services to one or more applications subsystems residing outside the scope of the security subsystem. In selected embodiments, the security subsystem is configured to accelerate the authentication process of boot codes at device startup while keeping the advantage of strong authentication via public-key cryptography verification without mandating the need for dedicated cryptographic accelerators. In other embodiments, the security subsystem is configured to allow the authentication of application software (code/data) during application run-time by providing a two-step process, including a secure memory region (SMR) installation phase (which declares the boot-codes to be verified, generates an alternate proof of authenticity for the given SMR, and associates the verified boot-codes with one of the available application subsystems) and a boot-code verification phase (which runs an SMR verification that is performed over the alternate authenticity proof and takes an action depending on the results of the SMR verification). In other embodiments, the security subsystem is configured to link the SMR verification results to a set of configurable and versatile system reactions or sanctions that include a specified fail-operational mode or degraded mode of operation, along with a device disablement mode. As a result, the system can continue operation after security and/or safety events using a specified fail-operational mode.

As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. In addition, it will be appreciated that the techniques described herein can be applied to any type of computer network system, including but not limited to computer systems connected in an in-vehicle network (IVN), Controller Area Network (CAN), a Local Interconnect Network (LIN), an Ethernet network, and the like.

To provide additional details for an improved contextual understanding of the present disclosure, reference is now made to FIG. 1 which depicts a simplified top-level system view of a data processing system on a chip (SoC) 1 which includes several accumulated processor functions and resources 2-9 which operate in cooperation with a hardware security subsystem 10 to provide a fast and versatile secure boot process for the data processing SoC 1. As depicted, data processing SoC 1 includes one or more application central processing unit (CPU) subsystems 2, application random access memory (RAM) 3, a communication or system bus 5, and a security subsystem interface 4 for communicating with the security subsystem 10. In addition, the system bus 5 is connected to one or more peripheral subsystems 6, one or more external memory interfaces, such as DDR interface 7A or flash interface 8A, and an application non-volatile memory (NVM) 9. In turn, the external memory interfaces may be connected to external memory, such as DDR memory 7B (for storing application RAM 7C) or flash memory 8B (for storing application NVM 8C). Each SoC subsystem block is bi-directionally connected to the system bus 5. In one embodiment, the data processing SoC 1 may be implemented as circuitry on a single integrated circuit. In addition, the system bus 5 can be any type of bus structure, including but not limited to an advanced high-performance bus (AHB) or an advanced peripheral bus (APB). In addition, the application CPU subsystem(s) 2 may be any type of processing circuit, including but not limited to a microprocessor (MPU), microcontroller (MCU), digital signal processor (DSP), or another type of processor or processor core. Though not shown, the data processing SoC 1 may include peripheral devices or special-purpose processors used to control peripheral units, such as for example, a direct memory access (DMA) peripheral, communication interfaces, timers, encoders/decoders, etc.

The depicted data processing SoC 1 also includes a security subsystem 10 which is depicted as being embodied as a subsystem within the data processing SoC 1, but which may also be embodied as a standalone microprocessor. However embodied, the security subsystem 10 may be implemented as a deterministic hardware state machine or a composition of software and hardware (e.g., firmware) executing on one or more dedicated CPU cores 11 to implement control logic 14 to govern overall system security by providing a fast, versatile and secure boot process to ensure strong authentication of boot codes based on public-key cryptography verification along with authentication of application software during application runtime which can use dynamically configurable and versatile system reactions or sanctions at any given time.

As depicted, the depicted security subsystem 10 may include security subsystem resources—such as a CPU 11, crypto engine 12, timer 13, control logic 14, and secure memory 17, 18—which are configured to ensure the integrity and authenticity of operations of the application CPU subsystem 2. For example, the CPU subsystem 11 processes its files and controls its resources to offer a set of security services to the application domain (the host). In addition, the security subsystem 10 may include one or more cryptographic accelerators 12 for performing encryption/decryption, hashing, signature verification, and the like. For example, the cryptographic accelerators 12 may be a TDES engine, an AES engine supporting all standard key sizes (128, 192, 256 bits) and various complex ciphering modes (CBC, CTR, GCM, etc.), a hash engine that supports standard SHA1 and SHA2 hash primitives up to 512-bit digest, and/or a Public Key Cryptographic engine (PKC) which accelerates RSA and ECC operations. The security subsystem 10 may also include one or more timers 13, such as a system timer to allow recurring autonomous functions such as run-time memory verification checks, and a watchdog timer to reset the security subsystem in case of unexpected run-time failure. In addition, a True Random Number Generator (not shown) may be included for use as the entropy source to seed the Deterministic Random Number Generator (DRNG, aka DRBG or PRNG) available to the host via dedicated random generation services. Finally, one or more memory resources are provided on the security subsystem 10, including a secure RAM 15 (which is exclusively accessible by the security subsystem 10 for use in operating the security subsystem firmware and/or storing a copy of the cryptographic keys in service) and a secure nonvolatile memory 18 (which is exclusively accessible by the security subsystem 10 for use in storing the security subsystem firmware, such as the firmware image (FW-IMG), any extension executable file (XFW-IMG), and any related security system image (SYS-IMG) that contains the public and private keys and configuration data. In Flash-less data processing SoCs, the security subsystem firmware may be stored on an external Flash device that manages the security assets in an encrypted form so that it cannot be read in plain by the application.

Using the depicted resources 11-18, the security subsystem 10 may be configured to provide security service functionality to one or more application CPU subsystems 2 which interface with the security subsystem 10 through one or more communication channels, such as the system bus 5, registers or memory (e.g., RAM 3), or a wired control interface connection 19. Thus, the security subsystem 10 has read access to SOC memory areas 3, 7C, 8C, 9 where boot-code and application software are stored and executed by the device's application CPU subsystems 2. The security subsystem 10 performs relevant security functions for applications having stringent confidentiality and/or authenticity requirements, including isolating security-sensitive information (e.g., secret keys) from the application (the host), offloading the application from processing cryptographic operations, accelerating cryptographic operations with dedicated coprocessors, and enforcing security measures on the application during run-time and system startup. In operation, the security subsystem 10 is the only master that operates after power-on reset (POR), and is configured to release from reset select CPU subsystems in the host with the opportunity to apply certain checks beforehand (secure boot). It can also trigger interrupts and reset signals to the host during run-time, based on certain conditions.

In accordance with the present disclosure, the security service functionality provided by the security subsystem includes a memory verification service which uses an installation process/service 16 and verification process/service 17 to provide a fast and versatile multicore SoC secure boot process for the data processing SOC 1. As depicted, the installation and verification processes 16, 17 can run from the secure RAM 15, or may instead be run as services 16A, 17A from the secure NVM 18, but in any case, must be run from the security subsystem 10. As described more fully hereinbelow, the installation process/service 16, 16A is configured to install a secure memory region (SMR) in the application RAM 3 by using a boot-code declaration process to configure an SMR table 18A which defines a start address, size, and associated proof of authenticity which authenticates the SMR's content. For all SMRs that have been defined, the installation process/service 16, 16A is also configured to associate the successfully installed SMRs with one of the available application subsystems 2 by configuring a core reset table 18B which defines a Core ID with associated SMR entries and sanctions applied on application subsystems after the pre-boot and post-boot phases, depending on the SMR verification status. In addition, the installation process/service 16, 16A may be configured to associate the successfully installed SMRs with cryptographic keys by configuring a crypto key table 18C which defines a Key ID with associated SMR entries. Once the SMR table 18A and core reset table 18B are installed, the verification process/service 17, 17A is configured to verify the authenticity of memory contents for all SMRs that have been defined during the device start-up phase (after reset) and/or while the application(s) is(are) running on the host side (during run-time). The boot-code verification process/service 17, 17A also determines the sanctions imposed on the system by the security subsystem 10, including not only keeping unsuccessfully verified subsystems in a reset state, but also other specified fail-operational modes or degraded modes of operation if there is no successful verification, such as disallowing or limiting usage of one or more of the system resources or cryptographic keys handled by the security subsystem 10.

Another subset of its security service functionality, the security subsystem 10 may be configured to provide access to security services by an application CPU subsystem 2 residing outside the scope of the security subsystem 10. Such security service may, for example, be a cryptographic operation conducted by a crypto engine 12 on an application-provided ciphertext or plaintext and using a cryptographic key.

Another security service functionality provided by the security subsystem 10 is to protect secret assets, such as the key used with the security service operation. To this end, the security subsystem 10 may store the key in secure nonvolatile memory (NVM) 18 which is protected by the security subsystem 10 with an access policy executed by the CPU 11 and/or control logic 14. Based on policy access decisions, the security subsystem 10 may allow or deny a request for access to the key or to a security service.

Another security service functionality provided by the security subsystem 10 is a system control functionality for controlling the application CPU subsystem(s) 2. Examples of system control include the ability reset select application processors, to configure and control access to peripherals, to configure and control memory access policies, and to reset or pause select application cores at each application CPU subsystem 2. And while each application CPU subsystem 2 that interacts with the security subsystem 10 is prevented from accessing secret assets directly, it may instead use select assets through security services which are provided by the security subsystem 10 and configured to not reveal information on the cryptographic keys and other assets protected by the security subsystem 10.

As described above, the data processing SoC 1 includes an application domain and a security domain. The application domain is implemented by the application CPU subsystem 2 and supporting system resources, including on-chip memory resources (RAM 3, NVM 9), security subsystem interface 4, system bus 5, peripheral subsystems 6, and external memory interfaces (e.g., DDR I/F 7A or Flash I/F 8A). In addition, the security domain is implemented by the security subsystem 10 which communicates with the application domain via the security subsystem interface 4 and/or a dedicated interface 19. In selected embodiments, the security subsystem 10 may be a Hardware Security Engine (HSE) subsystem which has its own exclusive system resources 11-18 and connects to the host application CPU subsystem(s) 2 via a dedicated interface 19. In this way, each device subsystem (including the HSE 10) may be referred to as system master (or master) which has read and/or write accesses, via the system bus 5, to certain on-chip and off-chip resources, but there are access restrictions which protect security subsystem resources (e.g., secure memory 15, 18) at the security subsystem 10 from being directly accessed by the application CPU subsystem(s) 2.

In operation, application firmware executed by the application CPU subsystem 2 must first be properly authorized before being granted access to services of the security subsystem 10 and/or before being allowed use of cryptograph assets, such as keys stored in the secure memory 18. In other words, the application firmware is verified for authenticity prior to its execution by an application processor using a process commonly referred to as a "secure boot" process which is understood as the process to ensure the integrity and authenticity of one or several application images being executed by one or several application CPU subsystems 2 within the application domain. Accordingly, the security subsystem 10 is the first and only subsystem to start after system reset using startup code that is immutable software to initialize the security subsystem 10 and to run the startup flow before all other application CPU subsystems 2. For instance, the security subsystem 10 can be responsible to release application CPU subsystems 2 from reset, it can also enable or disable certain peripherals 6 used during the startup process, or it can restrict the resources available (primarily memories) to certain application CPU subsystems 2. After retrieving a startup configuration, the startup code also loads an "HSE firmware image" (FW-IMG) and any related system image (SYS-IMG) from nonvolatile memory (e.g., NVM 18 or Flash 8B) to RAM 15 as an executable that runs in the security subsystem 10. The FW-IMG is then decrypted and verified prior to continue with the startup flow. In similar fashion, an "application image" (APP-IMG) is a stream of bytes (an executable) which may be stored in NVM 9 and optionally copied to RAM 3 before being executed by the application CPU subsystem 2 it is associated with. Finally, the "HSE system image" (SYS-IMG) is an encrypted and authenticated data set that contains the security subsystem security assets and configuration and that is used by the security subsystem 10 (i.e., the HSE firmware).

Figure 2:
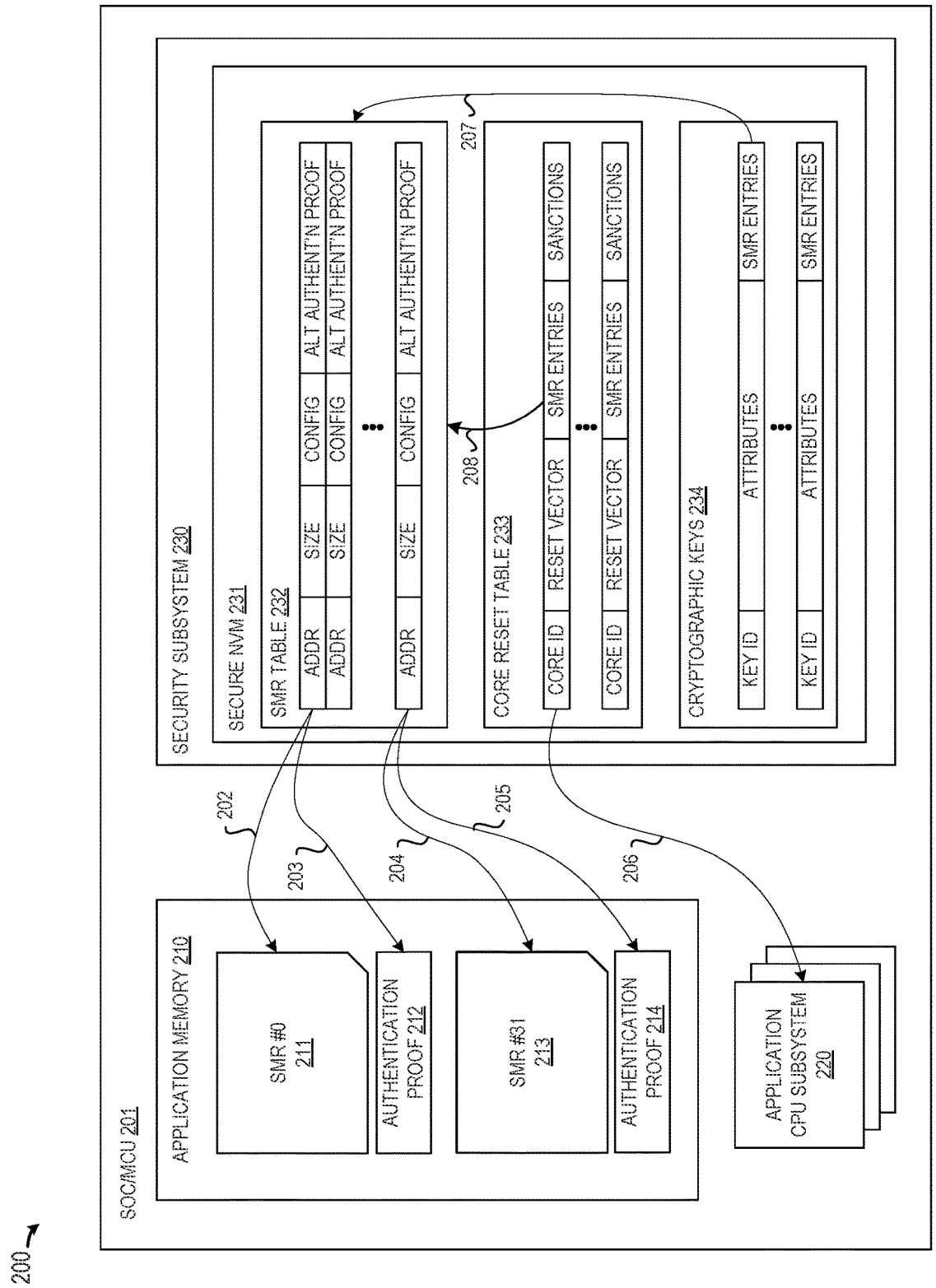
FIG. 2 depicts a system diagram of a data processing system that is configured to accelerate boot code authentications of application software during application run-time and link verification results to configurable and versatile system sanctions in accordance with selected embodiments of the present disclosure.

To provide additional details for an improved understanding of selected embodiments of a fast and versatile secure boot method disclosed herein, reference is now made to FIG. 2 which depicts a system diagram 200 of a data processing SoC or MCU 201 that is configured to accelerate boot code authentications of application software during application run-time and link verification results to configurable and versatile system sanctions. In the depicted system 200, the security subsystem 230 executes security firmware at startup to obtain access to the secure NVM 230 and cryptographic keys 234, as well as the application memory 210 and application CPU subsystems 220. With this access, the security subsystem 230 is able to provide each host (application subsystem 220) with memory verification services which use an installation phase (e.g., installation process/service 16) and a verification phase (e.g., verification process/service 17) to provide proof of authenticity for each memory region content.

In the installation phase, the security firmware is executed at the security subsystem 230 to divide the installation phase into two distinct processes, including a first declaration process which declares the boot-codes to be verified, and a second association process which associates the boot-codes with an available application subsystem/host 220. To implement the first declaration process, the security subsystem 230 may provide an SMR installation service which associates each of the boot-codes to be verified at device startup with a corresponding Secure Memory Region (SMR) 211, 213. With the SMR installation service, the security subsystem 230 allows the application subsystem/host 220 to provide SMR attributes for each defined boot-code that are used for configuring an SMR table 232 which identifies each of the secure memory regions (SMRs) 211, 213 to be subsequently verified (up to 32), effectively providing pointers 202, 204 to the associated SMRs 211, 213. For example, each entry in the SMR table 232 may be configured with an index that uniquely identifies the corresponding SMR. In addition, each entry in the SMR table 232 may be configured with a starting address of the memory region containing the code (and/or data) to be verified, a size of the memory region, and an optional destination address where the memory region is copied after it is successfully verified. In selected embodiments, the start address lies in Flash memory external to the SOC/MCU device 201 and the destination address lies in RAM within the device. In other embodiments, the memory region is encrypted and decrypted at the destination address using a decryption process that takes place in the security subsystem 230, in which case an encryption/decryption key must be specified. In addition, each entry in the SMR table 232 may be configured with an initial authenticity proof and its characteristics or type (e.g., ECDSA signature on a specified elliptic curve) which, upon successful verification by the security subsystem 230, triggers the calculation of a reference authentication proof 212, 214 for each SMR 211, 213 known only by the security subsystem 230. For the initial authentication, the SMR table 232 may also be configured with reference to the key to be used to verify the initial proof of authenticity (the authentication key). Finally, each entry in the SMR table 232 may be configured with an alternate authenticity proof for verifying how and when the SMR is to be subsequently verified by the security subsystem 230 (e.g., either by the security subsystem 230 independently from the host 220, or by the host 220 itself).

In operation, the security subsystem 230 may use the SMR installation service to verify the initial or reference authenticity proof and take actions toward the application subsystem/host 220 based on the verification result. To this end, the SMR installation service may process the SMR parameters received from the application subsystem/host 220 by first verifying the memory region (e.g., 211) specified by the pointer (e.g., 202). In selected embodiments, the initial verification is based on the input authentication key, the initial authenticity proof, and the specified verification scheme. As illustrated with the first SMR #0 211, the memory region should be within the application memory range 210 directly accessible by the security subsystem 230. In addition, the security subsystem 230 should be able to handle diverse verification schemes, including but not limited to public-key cryptography (e.g., RSA/ECC signatures with standard padding schemes) or secret key cryptography (e.g., HMAC, CMAC), etc. In embodiments where the secure memory region is encrypted, the security subsystem 230 may require that the SMR attributes configured in the SMR table 232 include an additional decryption key in order to decrypt the memory region content before (or after) authenticating it and before it is optionally copied to the destination memory address. If verification fails, the SMR installation service indicates an error to the application subsystem/host 220 and exits the installation service. However, upon successful verification, the SMR installation service will compute an alternate proof of authenticity for the given SMR for storage in the SMR table 232 along with the SMR attributes provided by the application subsystem/host 220. In selected embodiments, the alternative authenticity proof is calculated with the fastest function available to the security subsystem 230. Finally, the SMR installation service may indicate a successful configuration to the application subsystem/host 220.

As illustrated in the example data processing SoC or MCU 201, the SMR installation process may configure an SMR table 232 to install multiple SMRs 211, 213 in the security subsystem 230, depending on the storage capacity of the secure NVM storage 231. In addition or in the alternative, different SMRs can be sequentially installed in the SMR table 232 for different application life-cycles or mode of operations. In such case, a subset of SMRs can be used for normal operation, while another subset is used during memory update or in case of a safety-fallback situation. The mode selection can be done securely from a trusted (i.e., verified) code.

To implement the second association process which associates the boot-codes with an available application subsystem/host 220, the security subsystem 230 may provide a core reset table installation service which associates each of the successfully installed SMRs 211, 213 to a corresponding application subsystem/host 220. With the core reset table installation service, the security subsystem 230 allows the security subsystem 320 to configure a code reset table 233 to specify how and when the subsequent verification process is triggered (e.g., either by the HSE independently from the host, or by the host itself). For example, each entry in the code reset table 233 may be configured with a core index (CORE ID) that uniquely identifies the corresponding application subsystem/host 220 with a pointer 206. In addition, each entry in the code reset table 233 may be configured with a set of SMR entries which identifies an entry in the SMR table 232, such as by using a pointer 208. In addition, each entry in the code reset table 233 may be configured with a sanction to take in case one of the associated SMRs fails the verification process. In addition, each entry in the code reset table 233 may also be configured with a reset vector which defines a reset address where the corresponding application subsystem/host 220 is released from reset upon successful verification of all the associated SMR. In addition or in the alternative, each entry in the code reset table 233 may also be configured with an alternate reset addresses that define addresses where the corresponding application subsystem/host 220 can be released from reset upon failed verification of one of the associated SMR, and depending on the sanctions defined.

With the core reset table installation service, the security subsystem 230 allows the application subsystem/host 220 to provide the core reset table attributes for each of the corresponding application subsystem/host 220. Upon reception of these attributes, the security subsystem 230 is configured to verify the successful installation of the SMR to one or more associated corresponding application subsystem/host 220 (there can be more than one). In addition, the security subsystem 230 is configured to verify the validity of the reset addresses, such as by confirming that the addresses are within at least one of the SMRs provided in input. And upon successful verifications, the security subsystem 230 is configured to save the attributes and CPU subsystem association in the core reset table 233 that is store in the secure NVM 231.

While the core reset table installation process is described with reference to a process for associating SMRs with corresponding application subsystem/host 220, it will be appreciated that the SMR(s) may be associated with other resources under the control of the security subsystem 230. For example, the security subsystem 230 may provide a key installation service which associates or links the usage of certain cryptographic keys 234 to the verification status of certain SMR. With the key installation service, the security subsystem 230 allows the application subsystem/host 200 to configure a cryptographic key table 234 to specify entries for each key, including a first key index (KEY ID) that uniquely identifies the corresponding cryptographic key. In addition, each entry in the cryptographic key table 234 may be configured with a set of SMR entries which identifies an entry in the SMR table 232, such as by using a pointer 207. In addition, each entry in the cryptographic key table 234 may be configured with one or more attributes for the usage of the associated cryptographic key.

To implement the verification phase, the security subsystem 230 may provide an SMR verification service which is automatically triggered during the device start-up phase (after reset) and/or while the application(s) is(are) running on the host side (during run-time) to provide proof of authenticity for each secure memory region (SMR) 211, 213. With each entry in the previously-configured core reset table 233, the SMR verification service verifies the authenticity of the declared SMR using the SMR entries to access 208 the SMR table parameters 232, and then takes actions specified by the sanctions field of the core reset table 233 based on the SMR verification results. In order the accelerate verification of the SMR authenticity, the verification is performed over the alternate authenticity proof previously calculated during the SMR installation and specified in the SMR table 232, though it may optionally be possible to perform the authenticity check using the initial proof of authenticity. For data processing SoCs where the SMRs needs to be relocated from external Flash memory to internal application memory 210, the SMRs authenticity check may be done "on the fly" during the transfer with no or minimum impact of booting performances. Since the verification phase is timing critical, the use of an alternate authentication proof which provides the fastest possible verification function allows the overall verification process at startup to be accelerated. For example, instead of relying on a cryptographic accelerator, the verification phase can use a simple CRC or a hash function for the alternate authentication proof, thereby relaxing the performance target for the security subsystem 230 compared to conventional approaches.

When the verification phase determines that all the SMRs declared for a core reset table entry pass the verification, the associated application subsystem/host 220 for that entry is released from reset by sending a release message 206 to the address referenced in the core reset table 233. However, when one of the SMRs fails the verification, the verification phase applies one of a plurality of different sanctions defined by the sanctions field of the core reset table 233. Examples of sanctions include, but are not limited to, resetting the whole device 201 and/or keeping the unverified application subsystem/host 220 in reset. Additional specified sanctions may include releasing the application subsystem/host 220 from reset, but restricting device usage for that subsystem. Examples of such restrictions include, but are not limited to, disallowing usage of all the cryptographic keys handled by the security subsystem 230, disallowing usage of certain cryptographic keys (e.g., the keys related to the same SMR that are referenced for the application subsystem/host 220 in question), and/or disallowing access to certain device resources (e.g., certain peripherals or certain memory regions).

In accordance with other embodiments of the present disclosure, the verification phase may be triggered in a number of different ways by the security subsystem 230, depending on the verification method defined during the installation phase. For example, the verification phase may be triggered as part of the boot-code verification at device startup before any application CPU subsystem is released from reset. In addition or in the alternative, the verification phase may be triggered at device startup after having released all application CPU subsystems from reset. This is similar to the boot-code verification method where the same sanctions apply in case of verification failure, except for keeping the associated application CPU subsystem in reset. In addition or in the alternative, the verification phase may be triggered on-demand during device run-time when one of the application CPU subsystems issues an "on demand" request for verification. For an on-demand verification during run-time, the security subsystem 230 verifies only the SMR referenced by the application, and does not apply the sanctions that are defined in the core reset table 233. However, other sanctions may apply if, for instance, the SMR is associated with other security assets within the secure subsystem (such a keys).

In addition to on-demand verification, the verification phase may be triggered "periodically" during device run-time by having verification requests issued automatically and/or at a regular interval of time. For a periodic verification during run-time, the security subsystem 230 may use one of its internal timers to trigger the verification phase. The timer can be configured with the timing parameters defined in the core reset table 233 or via a pre-defined configuration that would then apply to all cores. Upon failed verification, the security subsystem 230 can apply a range of different sanctions, including device reset and other sanctions for specified fail-operational modes. In a further option, the periodic verification can be triggered by a trusted (i.e., verified) code. In this case, the (trusted) application can accommodate with the updates of the memory regions periodically verified, since such verification cannot be stopped once it is started.

As disclosed herein, the overall security of the installation phase relies on the impossibility for the application subsystem/host 220 to modify the content of the SMR table 232 which is under the sole control of the security subsystem 230. In addition, the installation phase provides security by using the SMR installation process to verify the memory region with the input authentication key, such as a public key signature verification process. However, the SMR installation process is not timing critical, meaning that the potential public-key signature verification that would take place to validate the initial proof of authenticity can be realized without dedicated cryptographic accelerator. The reason why the initial authentication is not timing critical is that the overall speed of secure boot operations is increased by providing an SMR verification service which computes and uses an alternative authentication proof that is fast and does not necessarily rely on a cryptographic mean. For example, the SMR verification service could be configured to compute the alternative authentication proof as be a CRC, a hash operation or a MAC (Message Authentication Code) operation using a device-specific key, so long as this provides a suitably fast method to calculate the alternate proof of authenticity. In a further option to optimize the security and speed of boot operations, the alternate proof of authenticity can be calculated only on a select number of bytes chosen in a random or deterministic way so that it ensures enough coverage of the memory area to protect it against modification. When using this calculation technique, the SMR verification process can be further accelerated, but it might be able to detect only multi-byte changes (as opposed to a single byte change) in the protected memory region.

Figure 3:
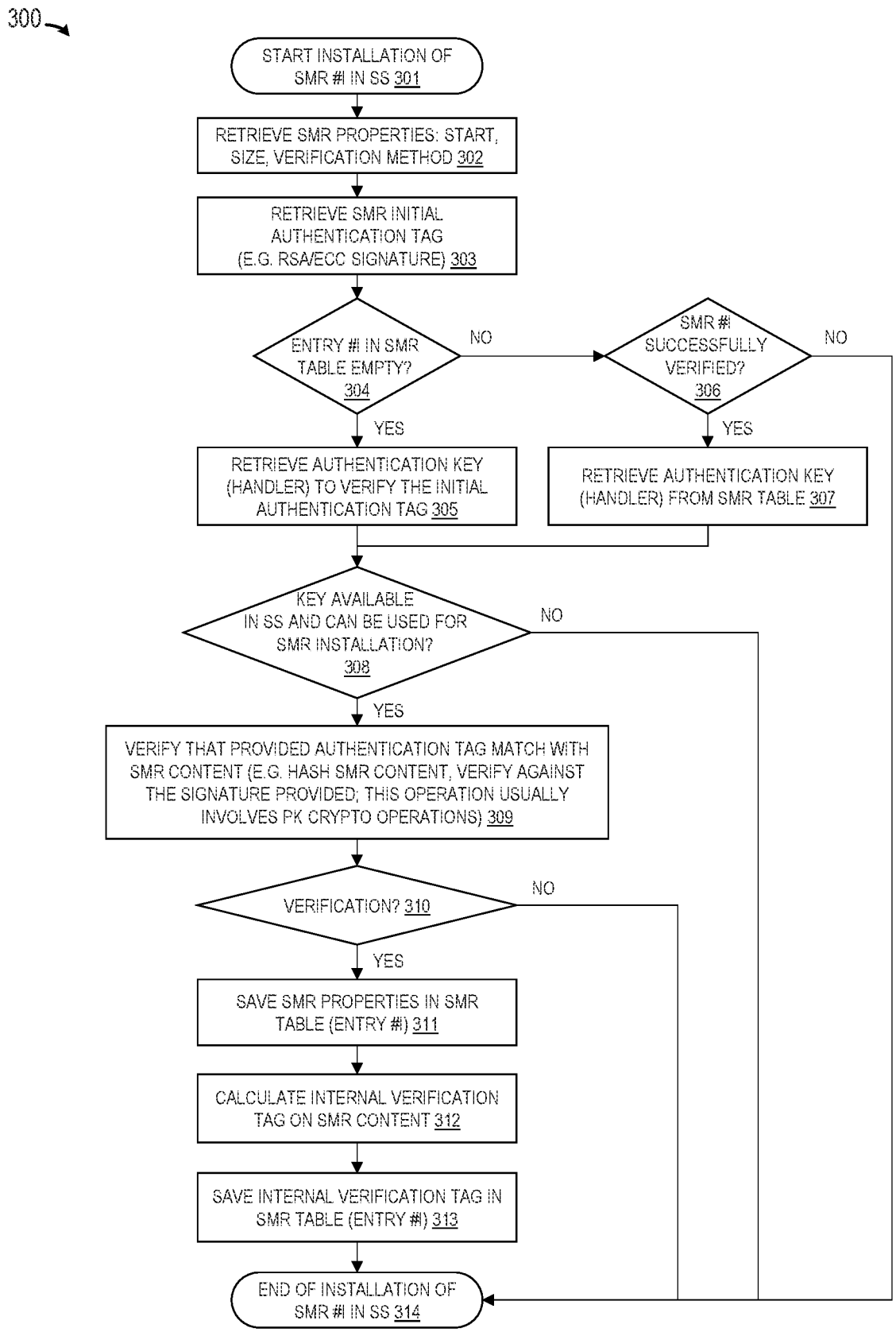
FIG. 3 depicts a simplified flow chart showing the logic for a first installation process of a secure memory region (SMR) to be verified at device startup or during runtime in accordance with selected embodiments of the present disclosure.

To provide additional details for an improved understanding of selected embodiments of the installation phase, reference is now made to FIG. 3 which depicts a simplified flow chart showing the logic for a first installation process 300 for associating a boot-code to be verified at device startup with a secure memory region. At step 301, a boot of a data processing system starts at system initialization, such as at power-on or during a reset type of event, when an SMR installation process starts in the security subsystem. In selected embodiments, the SMR installation process starts automatically at the security subsystem or when an application subsystem/host requests that the security subsystem run an SMR installation service and one or more SMR parameters are initialized.

At step 302, one or more SMR installation attributes may be retrieved for each SMR #I (e.g., I=0-31). In selected embodiments, the SMR properties may be retrieved when the application subsystem/host provides SMR parameters, such as the starting address, size, and verification method for each SMR installation process starts. At the security subsystem/SS, the SMR installation service receives the SMR parameters as inputs for each SMR to be verified.

At step 303, an initial SMR authentication tag is retrieved for each SMR which will provide a proof of authenticity over the SMR content. In selected embodiments, the initial SMR authentication tag is retrieved when the application subsystem/host provides the security system/SS with a pointer to nonvolatile memory where the initial authentication tag is located. As will be appreciated, any suitable authentication tag may be used, including but not limited to a public-key cryptography signatures (e.g., RSA/ECC/ECDSA signatures) or secret key cryptography (e.g., MAC, HMAC, CMAC), or the like.

At steps 304-314, the SMR installation process uses the retrieved SMR properties to populate the SMR table with SMR attributes for each SMR entry #I in the SMR table. Starting at step 304, the security system/SS determines if the SMR entry #I in the SMR table is empty. If the SMR entry #I is empty (affirmative outcome to detection step 304), the authentication key (or handler) is retrieved at step 305 to verify the initial authentication tag for the SMR entry #I. In selected embodiments, the security system/SS retrieves the authentication key (via its handler) at step 305 from the cryptographic key table 234 which was provisioned by the application subsystem/host 200 beforehand.

On the other hand, if detection step 304 determines that the SMR entry #I is not empty (negative outcome to detection step 304), then the next step 306 is to determine if the SMR #I was successfully verified. If the SMR #I is not successfully verified (negative outcome to step 306), then the security subsystem/SS ends the installation process for SMR entry #I (step 314). However, if the SMR #I is successfully verified (affirmative outcome to step 306), then the authentication key (or handler) is retrieved from the SMR table at step 307 to verify the initial authentication tag for the SMR entry #I. In selected embodiments, the security system/SS retrieves the authentication key (or handler) by using the pointer to nonvolatile memory where the initial authentication tag is located.

At step 308, the retrieved authentication key (handler) is evaluated to determine if the security subsystem/SS can access and use the key for SMR installation. In selected embodiments, the SMR installation process determines if the key is available using any suitable evaluation scheme, such as by confirming that the key type aligns with the initial authentication scheme selected, or by confirming that the key is stored in the NVM key catalog. If the key is not available (negative outcome to step 308), then the security subsystem/SS ends the installation process for SMR entry #I (step 314). However, if the key is available (affirmative outcome to step 308), then the installation process proceeds to step 309 where the installation process uses the retrieved authentication key to verify that the initial authentication tag matches with the content for SMR #I. While any suitable verification method may be used at step 309, selected embodiments of the SMR installation process may, for example, compute a hash of the SMR content for verification against the signature provided. As will be appreciated, this operation typically involves a public-key cryptographic operation, but the initial authentication proof may optionally use other algorithms.

At step 310, the installation process determines if the SMR verification was successful. If not (negative outcome to step 310), then the security subsystem/SS ends the installation process for SMR entry #I (step 314). However, if the verification was successful (affirmative outcome to step 310), this provides a proof of authenticity over the content of the SMR #I.

Upon determining that the initial verification was successful for the SMR #I, the installation process saves the SMR properties for the SMR #I entry (retrieved at step 302) into the SMR table at step 311, and then calculates or generates an internal verification at step 312. In selected embodiments, the internal verification tag is generated to serve as an alternate proof of authenticity for the SMR entry #I which may be quickly generated using a suitably fast function that eliminates the time and processing complexity of invoking a full cryptographic computation. At step 313, the installation process saves the internal verification tag in the SMR table for the SMR entry #I, and when all of the SMR entries have been processed, the installation process ends (step 314).

Figure 4:
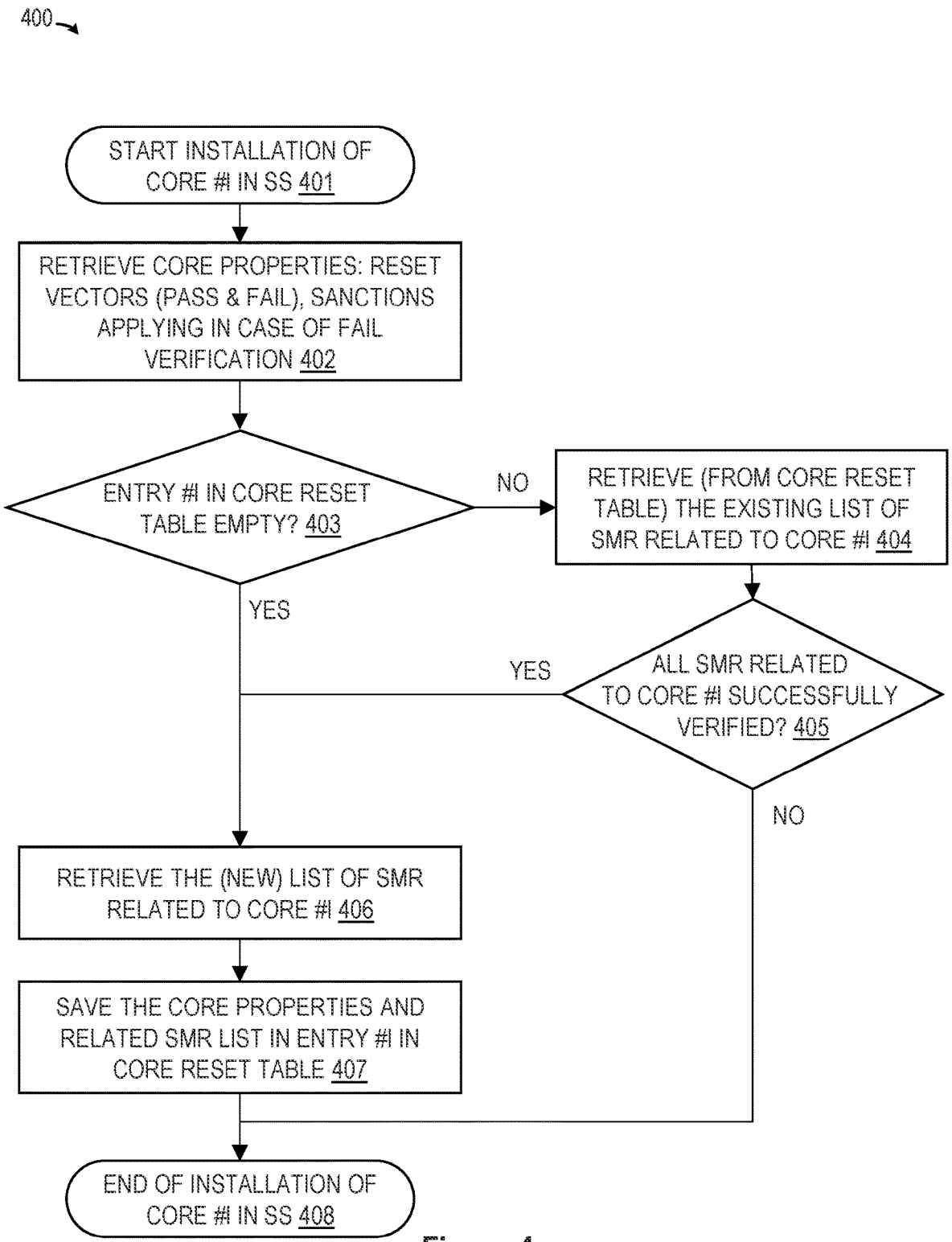
FIG. 4 depicts a simplified flow chart showing the logic for a second installation process for associating each installed SMR to a corresponding core in accordance with selected embodiments of the present disclosure.

To provide additional details for an improved understanding of selected embodiments of the installation phase, reference is now made to FIG. 4 which depicts a simplified flow chart showing the logic for a core installation process 400 for associating each installed SMR to a corresponding core. At step 401, the core installation process starts, such as when a core reset table installation process starts in the security subsystem. In selected embodiments, the core installation process starts automatically after the SMR installation process is completed or when an application subsystem/host requests that the security subsystem run a core reset table installation service to install one or more entries in the core reset table.

At step 402, one or more core property attributes may be retrieved for each core #I (e.g., I=1-5). In selected embodiments, the core properties may be retrieved when the application subsystem/host provides core parameters, such as the core entry number and a set of attributes for each core entry, such as the reset vector(s) for pass and fail results, and the specified sanction(s) to be applied in the event of verification failure. As disclosed herein, the specified sanction(s) may be selected from a plurality of different sanctions which include, but are not limited to, a device disablement mode, device reset, and one or more additional sanctions for a fail-operational mode or degraded mode of operation.

At steps 403-408, the core installation process uses the retrieved core properties to populate the core reset table with core attributes for each core entry #I in the core reset table. Starting at step 403, the security system/SS determines if the core entry #I in the core reset table is empty. If the core entry #I is empty (affirmative outcome to detection step 403), this indicates this is the first install, and a new list of SMRs related to core #I is retrieved at step 406 and then saved with the core properties (retrieved at step 402) in the core reset table at step 407.

On the other hand, if detection step 403 determines that the core entry #I is not empty (negative outcome to detection step 403), this indicates this is an update in which case the core reset table includes a list of SMRs related to the core #I. As a result, the security system/SS may then retrieve the existing list of SMRs related to the core #I from the core reset table at step 404. At step 405, the security system/SS determines if all SMRs related to the core #I were successfully verified. If not (negative outcome to step 405), then the security subsystem/SS ends the core installation process for core entry #I (step 408). However, if all SMRs related to core #I are successfully verified (affirmative outcome to step 405), then the (potentially new) list of SMRs related to core #I is retrieved at step 406 and then saved with the core properties in the core reset table at step 407.

Figure 5:
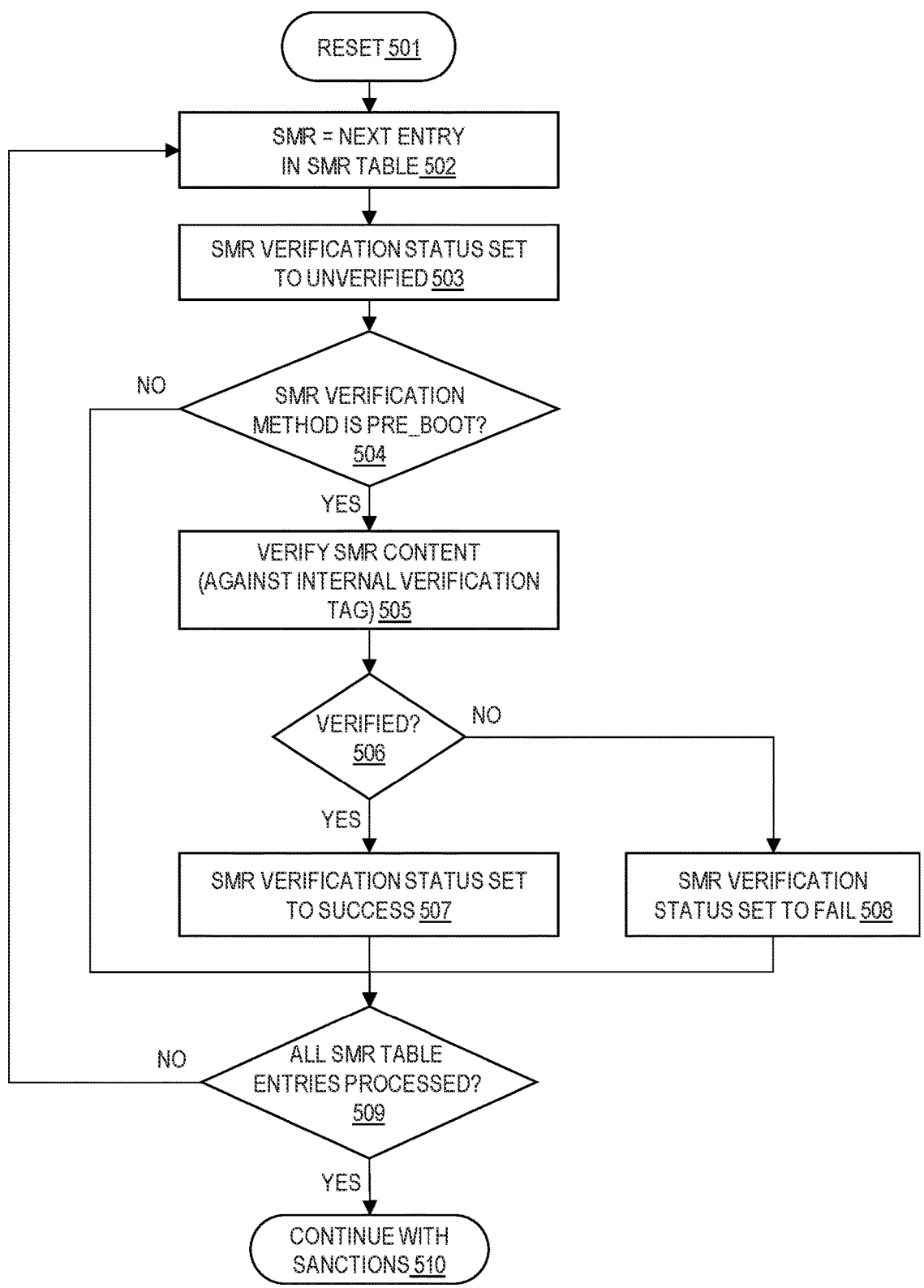
FIG. 5 depicts a simplified flow chart showing the logic for a boot-code verification flow that occurs at reset in accordance with selected embodiments of the present disclosure.

To provide additional details for an improved understanding of selected embodiments of the verification phase, reference is now made to FIG. 5 which depicts a simplified flow chart showing the logic for a boot-code verification flow 500 that occurs at reset, either during a pre-boot or post-boot phase. At step 501, the verification phase starts, such as when a device is reset or upon device startup. In selected embodiments, the verification phase is implemented at the security subsystem/SS by triggering an SMR verification service during the device start-up phase (after reset) and/or while the application(s) is(are) running on the host side (during run-time) to provide proof of authenticity for each secure memory region (SMR) 211, 213.

At step 502, an SMR table access begins by initializing (or incrementing) one or more parameters for accessing entries in the SMR table. For example, the security subsystem/SS may use an SMR verification service to initialize an entry index value i to be set to i=0.

At step 503, all SMR entries in the SMR table have their SMR verification status set to "unverified." In selected embodiments, the SMR verification service may declare all SMRs in the SMR table to be unverified, such as by initializing each SMR entry to include a preboot verification field preboot_verif=0 and a verification status field verif_status=0.

At step 504, the SMR entry corresponding to the entry index value is checked to see if the SMR should be verified. In selected embodiments, the SMR verification service may check a verification field in the SMR entry (e.g., SMR[i].verifMethod) to see if it is set to a predetermined value (e.g., SMR[i].verifMethod=pre_boot) which signals that the SMR should be verified at startup. If the verification field in the SMR entry is not set to the predetermined value (negative outcome to detection step 504), then the SMR verification service checks at step 509 to see if all SMR table entries have been processed. If not (negative outcome to detection step 509), then the next entry in the SMR is accessed by returning to step 502 where the next SMR entry is selected.

Returning back to step 504, if the verification field in the SMR entry #i is set to the predetermined value (affirmative outcome to detection step 504), then the SMR verification service verifies the corresponding SMR content for entry #i. In the first installation process, the SMR content is verified against the initial proof of authenticity and associated key. However and as indicated with the parenthetical reference—(against internal verification tag)—subsequent passes of the boot-code verification flow 500 verify the SMR content against the internal verification tag at step 505. As described hereinabove, the internal verification tag was previously generated to serve as an alternate proof of authenticity for the SMR entry that could be quickly verified.

At step 506, the success of the SMR verification is evaluated. In selected embodiments, the SMR verification service may verify the SMR content by retrieving the SMR content referenced by the SMR table, and then performing verification over the alternative authentication proof contained the corresponding SMR table entry. If the SMR verification was successful (affirmative outcome to step 506), then the SMR verification status in the SMR table may be set to indicate "success" (step 507), However, if the SMR verification was not successful (negative outcome to step 506), then the SMR verification status in the SMR table may be set to indicate "failure" (step 508).

After updating the verification status for the SMR entry i, the SMR verification service checks at step 509 to see if all SMR table entries have been processed. If not (negative outcome to detection step 509), then the next entry in the SMR is accessed by returning to step 502 where the next SMR entry is selected. However, if all SMR table entries have been processed (affirmative outcome to detection step 509), then the verification process continues by taking actions base on the results of the SMR verification, including processing the sanctions at step 510.

Figure 6:
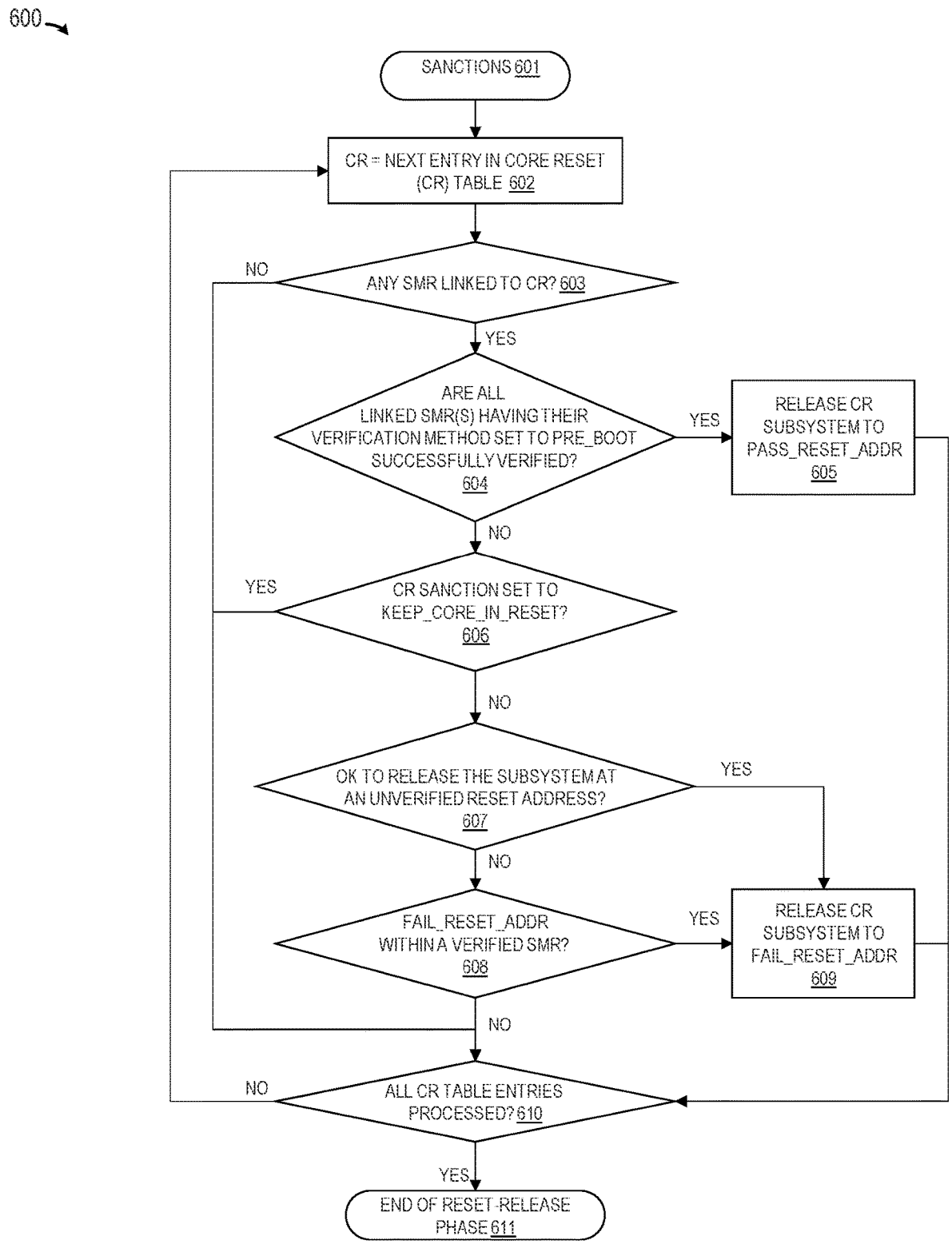
FIG. 6 depicts a simplified flow chart showing the logic for a sanctions process flow for implementing a configurable and versatile system sanctions in accordance with selected embodiments of the present disclosure.

To provide additional details for an improved understanding of selected embodiments of the verification phase, reference is now made to FIG. 6 which depicts a simplified flow chart showing the logic for a sanctions process flow 600 for implementing configurable and versatile system sanctions. At step 601, the sanctions process flow starts, such as when the SMRs identified in the SMR table have been verified upon device reset/startup. In selected embodiments, the sanctions process is implemented at the security subsystem/SS when SMR verification fails.

At step 602, a core reset table access begins by initializing (or incrementing) one or more parameters for accessing entries in the core reset (CR) table. For example, the security subsystem/SS may use a CR verification service to initialize an entry index value i to be set to i=0.

At step 603, the core reset table is evaluated to determine if the indexed core CR[i] has any linked SMRs. In selected embodiments, the sanctions process flow may check a data field in the CR table entry (e.g., CR[i].smrFlags) to see if there are any SMRs linked to the Cr. If there is no SMR linked to the core (negative outcome to detection step 603), then the sanctions flow checks at step 610 to see if all CR table entries have been processed. If not (negative outcome to detection step 610), then the next entry in the CR table is accessed by returning to step 602 where the next CR table entry is selected.

Returning back to step 603, if there is any SMR linked to the indexed core CR[i] (affirmative outcome to detection step 603), then the core reset table is evaluated at step 604 to determine if there has been successful verification of all SMRs that are linked to the indexed core CR[i] and that have their preboot_verif value set. In selected embodiments, the sanctions process flow may use the SMR entries field in the CR[i] table entry to access the entry(s) in the SMR table for the linked SMR(s) to retrieve the preboot verification field value (preboot_verif) and the verification status field value (verif_status) when evaluating step 604.

If detection step 604 determines that all linked SMRs have been successfully verified (affirmative outcome), then the core subsystem identified in the CR[i] table entry is released from reset at step 605. In selected embodiments, the sanctions process flow at step 605 may release the identified core subsystem by accessing the reset vector field in the CR[i] table entry to retrieve the reset address (pass_reset_addr) which defines the address where the core subsystem is released from reset upon successful verification of all the associated SMR. After step 605, the sanctions process flow proceeds to step 610 to determine if all CR table entries have been processed.

Returning back to step 604, if it is determined that all linked SMRs have not been successfully verified (negative outcome), this indicates that one of the system sanctions should be applied. In selected embodiments, the sanctions decision process is made at steps 605-608 which evaluate the sanctions field specified in the sanctions field of the CR[i] table entry. For example, step 605 evaluates the sanction field to determine if the CR sanction is to keep the core in reset. If the core is to be kept in reset (affirmative outcome to step 605), then the sanctions process flow proceeds to step 610, but if not (negative outcome to step 605), then the sanctions process flow proceeds to step 607 to evaluate the sanction field to determine if the CR sanction is to release the core subsystem at an unverified reset address. If the core subsystem can be released (affirmative outcome to step 607), then the core subsystem identified in the CR[i] table entry is released to the unverified address at step 609. In selected embodiments, the sanctions process flow at step 609 may release the identified core subsystem by accessing the reset vector field in the CR[i] table entry to retrieve the failed/unverified reset address (fail_reset_addr) which defines the address where the core subsystem is released from reset if an SMR verification failed. On the other hand, if the core subsystem cannot be released to the unverified address (negative outcome to step 607), then the sanctions process flow at step 608 determines if the fail reset address (fail_reset_addr) is within a verified SMR. If it is (affirmative outcome to step 608), then the core subsystem identified in the CR[i] table entry is released to the unverified address at step 609. However, if the fail_reset_address is not within a verified SMR (negative outcome to step 608, then the sanctions process flow proceeds to step 610 to determine if all CR table entries have been processed.

The processing steps 602-610 are iteratively repeated until all of the CR table entries have been processed (affirmative outcome to step 610), at which point the reset-release phase ends (step 611). In this way, the security subsystem uses the SMR verification results to impose sanctions on each application subsystem which seeks to execute application firmware. For a given application image, the disclosed secure boot process results in a verification PASS or FAIL response. In case of firmware verification, a PASS response (affirmative outcome at step 604) releases the CPU subsystem to the corresponding address (pass_reset_addr) (step 605), there allowing the application image to be executed by its targeted application CPU subsystem by enabling access to the requested security services, starting the verified application, and then running the application. However, in case the firmware verification fails, a FAIL response (negative outcome at step 604) triggers a sequence of sanction detection steps (steps 606-608) which to determine if the specified sanction is to keep the core in reset (step 606) or to release the core under specified conditions (steps 606-608) to implement a degraded state security mode for the application CPU subsystem that may be used during runtime to perform essential tasks. Depending on the functionality of the application CPU subsystem, the execution of a fail-operational mode may eliminate the need to perform a system reset and/or a full secure boot process which consumes both time and energy. If deemed necessary, the degraded application CPU subsystem may decide to reboot the system to perform secure boot and resume normal operations.

Figure 7:
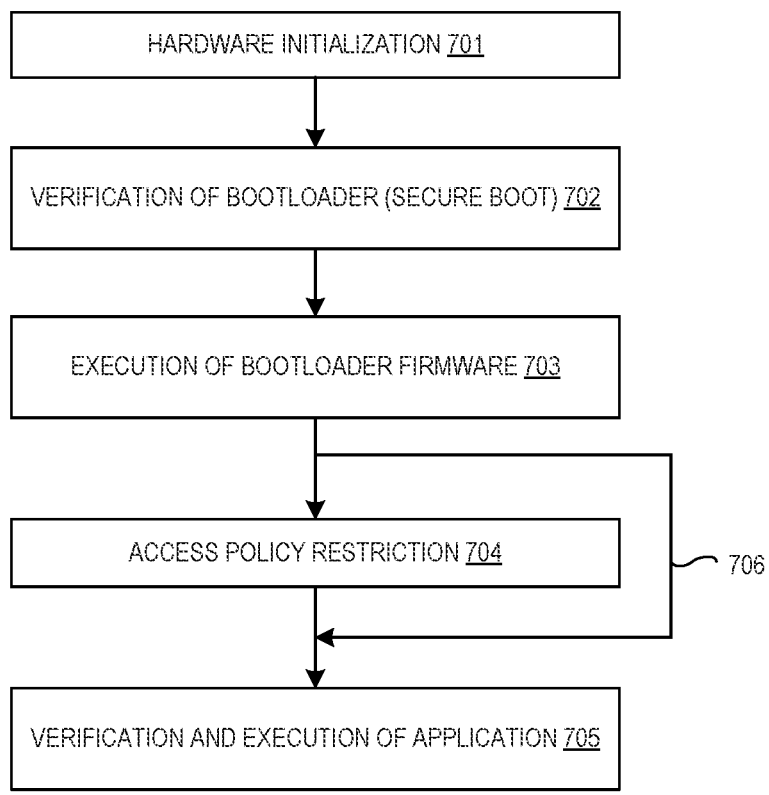
FIG. 7 which depicts a simplified flow chart showing the logic for an example boot process using multiple software stages to verify and execute an application.

In an example application of the present disclosure, the fast and versatile bootloader mechanism for securely accessing the system resources may be used in a standard boot flow process for verifying and executing an application. To provide additional details for an improved understanding of selected embodiments of the present disclosure, reference is now made to FIG. 7 which depicts a simplified flow chart showing the logic for an example boot process 700 using multiple software stages 701-705 to verify and execute an application. As will be appreciated, the boot process flow 700 may be executing software on an application processor in multiple stages that are executed sequentially. A first stage may, for example, be a bootloader which is protected by a secure boot, and a second stage may be an application which is verified and executed by the bootloader. At a first step 701, the hardware security subsystem is initialized during the boot of a data processing system that occurs at power-on or during a reset type of event and that may include self-testing. In selected embodiments, the security subsystem is the first and only subsystem to start after system reset which uses a secure startup code to initialize the security subsystem and run the startup flow. As a second step 702, the bootloader may be verified with a secure boot procedure. In selected embodiments of the secure startup flow, the bootloader verification at step 702 occurs after the secure startup code has completed the necessary initialization sequence, at which point execution is transferred to the secure subsystem firmware where select CPU subsystems from the application domain are conditionally released from reset using a bootloader verification phase. After successful verification of the bootloader, the bootloader firmware is executed on the application processor at step 703. At step 704, the bootloader applies any applicable/requested access policy restrictions to the security assets. In selected embodiments of the present disclosure, an example restriction that may be applied at step 704 is to remove permissions for an application to encrypt and sign data using a cryptographic key that is used to encrypt the application firmware. Such restriction effectively mitigates adversarial actions that aim at generating valid firmware images for the target system. In other embodiments, the access policy restriction step 704 may be skipped, leaving the application with the same level of access that is available to the bootloader application. However, in this case, the application may make use of an encryption service provided by the security subsystem to update the application firmware. At step 705, a firmware application can be verified and executed by the bootloader which may be operating with restricted access rights.

In another example application of the present disclosure, the bootloader mechanism for securely accessing the system resources may be used in an alternative boot flow process for verifying and executing an application software update. The alternative boot flow process is similar to boot process 700, except there is no access policy restriction step 704, as indicated by the bypass path 706. Instead of applying an access policy restriction, different update application is executed at step 705. In this example where there is no access restriction step, the update application is provided with the same level of access that is available to the bootloader application. In this case, the update application may make use of an encryption service provided by the security subsystem. The encryption service may then be used to update the application firmware.

By now it should be appreciated that there has been provided an apparatus, method, program code, and system for securely controlling operations of a data processing system on chip (SoC) which includes a security subsystem and one more application subsystems. As disclosed, the security subsystem is activated to control startup behavior of one or more application subsystems on the data processing SoC. In selected embodiments, the security subsystem is activated by initializing a hardware security subsystem during bootup of a data processing system to verify a bootloader. Subsequently, the security subsystem installs a first set of parameters for a secure memory region (SMR) where a boot-code is stored, where the first set of parameters include a starting address and size of the SMR, an initial authenticity proof for use with an initial verification process for the SMR, and an alternate authenticity proof for use with a subsequent verification process for the SMR. In selected embodiments, the security subsystem installs the first set of parameters by receiving the first set of parameters from the application subsystem seeking to execute the boot-code stored at the secure memory region (SMR). In selected embodiments, the security subsystem installs the first set of parameters by declaring the boot-code to be verified, and associating the boot-code with one or more application subsystems on the data processing SoC. After installing the first set of parameters, the security subsystem verifies the SMR to generate SMR verification results by using the initial authenticity proof for the initial verification process applied to the SMR, and by using the alternate authenticity proof for the subsequent verification process applied to the SMR to accelerate startup behavior as compared to using the initial authenticity proof. In selected embodiments, the subsequent verification process applied to the SMR is faster than the initial verification process applied to the SMR. And in other embodiments, the initial authenticity proof uses a public-key cryptography verification process, but the alternate authenticity proof does not use a public-key cryptography verification process. Base on the SMR verification results, the security subsystem applies a comprehensive system reaction for the application subsystem associated with the SMR. In selected embodiments, the security subsystem installs the first set of parameters to include one or more verification failure sanctions to be applied to an application subsystem executing the boot-code from the SMR. In such embodiments, the security subsystem may apply the comprehensive system reaction by selecting a system reaction from the group which includes releasing the application subsystem from reset to execute the boot-code stored at the SMR when the SMR verification results indicate the SMR has been verified, and applying the one or more verification failure sanctions to the application subsystem when the SMR verification results indicate the SMR has not been verified. In other embodiments, the security subsystem may apply the comprehensive system reaction by releasing the application subsystem from reset to execute the boot-code stored at the SMR based on the SMR verification results by applying the one or more verification failure sanctions to the application subsystem when the SMR verification results indicate the SMR has not been verified.

In another form, there has been provided a data processing system and associated method of securely controlling operations thereof. The disclosed data processing system includes an application subsystem coupled to a bus for executing instructions to issue a secure boot request. The data processing system also includes a security subsystem coupled to the bus to provide a secure boot in response to the secure boot request. As disclosed, the security subsystem includes a secure memory for storing security assets which are not directly accessible by the application subsystem. The security subsystem also includes installation control logic configured to install a first set of parameters for a secure memory region (SMR) where a boot-code is stored, where the first set of parameters includes a starting address and size of the SMR, an initial authenticity proof for use with an initial verification process for the SMR, and an alternate authenticity proof for use with a subsequent verification process for the SMR. In selected embodiments, the first set of parameters also includes one or more verification failure sanctions to be applied to an application subsystem executing the boot-code from the SMR. In selected embodiments, the installation control logic is configured to install the first set of parameters for the SMR by declaring the boot-code to be verified, and then associating the boot-code with one or more application subsystems on the data processing SoC. In addition, the security subsystem includes verification control logic configured to verify the SMR by generating SMR verification results using the initial authenticity proof for the initial verification process applied to the SMR, and then using the alternate authenticity proof for the subsequent verification process applied to the SMR to accelerate startup behavior as compared to using the initial authenticity proof. In selected embodiments, the verification control logic configured so that each subsequent verification process applied to the SMR is faster than the initial verification process applied to the SMR. In addition, the verification control logic may be configured to use a public-key cryptography verification process for the initial authenticity proof, and to not use a public-key cryptography verification process for the alternate authenticity proof. The security subsystem also includes sanctions control logic configured to apply a comprehensive system reaction for the secure boot request by the application subsystem based on the SMR verification results. In selected embodiments, the sanctions control logic is configured to apply the comprehensive system reaction by releasing the application subsystem from reset to execute the boot-code stored at the SMR when the SMR verification results indicate the SMR has been verified. In other embodiments, the sanctions control logic is configured to apply the comprehensive system reaction by applying the one or more verification failure sanctions to the application subsystem when the SMR verification results indicate the SMR has not been verified. In other embodiments, the sanctions control logic is configured to apply the comprehensive system reaction by releasing the application subsystem from reset to execute the boot-code stored at the SMR based on the SMR verification results by applying the one or more verification failure sanctions to the application subsystem when the SMR verification results indicate the SMR has not been verified.

In yet another form, there is provided a secure boot method for a computer with one or more application subsystems and a hardware security subsystem. In the disclosed secure boot method, the hardware security subsystem is initialized during bootup of a data processing system to verify a bootloader. Once initialized, the hardware security subsystem receives a secure boot request at the hardware security subsystem from a first application subsystem. In addition, the hardware security subsystem installs a first set of parameters for a secure memory region (SMR) where a boot-code is stored, where the first set of parameters includes a starting address and size of the SMR, an initial authenticity proof for use with an initial verification process for the SMR, an alternate authenticity proof for use with a subsequent verification process for the SMR, and one or more verification failure sanctions to be applied to an application subsystem executing the boot-code from the SMR. In addition, the hardware security subsystem verifies the SMR to generate SMR verification results by using the initial authenticity proof for the initial verification process applied to the SMR, and by using the alternate authenticity proof for the subsequent verification process applied to the SMR to accelerate startup behavior as compared to using the initial authenticity proof. After verification, the hardware security subsystem generates a comprehensive system reaction for the secure boot request based on the SMR verification results. In selected embodiments, the comprehensive system reaction is generated by applying the one or more verification failure sanctions to the application subsystem when the SMR verification results indicate the SMR has not been verified. In selected embodiments, each subsequent verification process applied to the SMR is faster than the initial verification process applied to the SMR. In selected embodiments, the SMR verification results are generated by using a public-key cryptography verification process for the initial authenticity proof and by not using a public-key cryptography verification process for the alternate authenticity proof.

A system, method, and apparatus are provided for securely controlling operations of a data processing system by activating a security subsystem to control startup behavior of application subsystems, installing SMR parameters which include an initial authenticity proof for use with an initial verification process for the SMR and calculating an alternate authenticity proof for use with a subsequent verification process for the SMR, and then by subsequently verifying the SMR using the alternate authenticity proof for the subsequent verification process applied to the SMR so that the security subsystem can apply a comprehensive system reaction for the application subsystem based on the SMR verification results.

Although the described exemplary embodiments disclosed herein focus on a data processing SoC security subsystem which uses defined installation and verification phases to provide a fast and versatile secure boot mechanism for accelerating the authentication process during startup, the present invention is not necessarily limited to the example embodiments illustrate herein and may be applied to any security system that may dynamically specify access privileges to security services and/or protected assets. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

It should also be noted that at least some of the operations for the methods described herein may be implemented in whole or in part with hardware and/or software instructions stored on a computer useable storage medium for execution by a computer. As an example, an embodiment of a computer program product includes a non-transitory, computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the disclosure may be implemented entirely in hardware or in an implementation containing both hardware and software elements. In embodiments which use software, the software may include but is not limited to firmware, resident software, microcode, etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for securely controlling operations of a data processing system on chip (SoC), comprising:

activating a security subsystem to control startup behavior of one or more application subsystems on the data processing SoC;

installing, at the security subsystem, a first set of parameters for a secure memory region (SMR) where a boot-code is stored, where the first set of parameters comprises a starting address and size of the SMR, an initial authenticity proof for use with an initial verification process for the SMR, and an alternate authenticity proof for use with a subsequent verification process for the SMR;

verifying the SMR, at the security subsystem, to generate SMR verification results by using the initial authenticity proof for the initial verification process applied to the SMR, and by using the alternate authenticity proof for the subsequent verification process applied to the SMR; and applying, by the security subsystem, a comprehensive system reaction for the application subsystem based on the SMR verification results.

2. The method of claim 1, where the first set of parameters comprises one or more verification failure sanctions to be applied to an application subsystem executing the boot-code from the SMR.

3. The method of claim 1, where applying the comprehensive system reaction comprises selecting a system reaction from the group comprising:

releasing the application subsystem from reset to execute the boot-code stored at the SMR when the SMR verification results indicate the SMR has been verified; and applying the one or more verification failure sanctions to the application subsystem when the SMR verification results indicate the SMR has not been verified.

4. The method of claim 1, where applying the comprehensive system reaction comprises releasing the application subsystem from reset to execute the boot-code stored at the SMR based on the SMR verification results by applying the one or more verification failure sanctions to the application subsystem when the SMR verification results indicate the SMR has not been verified.

5. The method of claim 1, where installing the first set of parameters for the secure memory region (SMR) comprises:

declaring the boot-code to be verified; and associating the boot-code with one or more application subsystems on the data processing SoC.

6. The method of claim 1, where each subsequent verification process applied to the SMR is faster than the initial verification process applied to the SMR.

7. The method of claim 1, where the initial authenticity proof uses a public-key cryptography verification process, and where the alternate authenticity proof does not use a public-key cryptography verification process.

8. The method of claim 1, where installing the first set of parameters comprises receiving the first set of parameters from the application subsystem seeking to execute the boot-code stored at the secure memory region (SMR).

9. A data processing system comprising:

a bus;

an application subsystem coupled to the bus for executing instructions to issue a secure boot request; and a security subsystem coupled to the bus to provide a secure boot in response to the secure boot request, where the security subsystem comprises a secure memory for storing security assets which are not directly accessible by the application subsystem, wherein the security subsystem is configured to:

install a first set of parameters for a secure memory region (SMR) where a boot-code is stored, where the first set of parameters comprises a starting address and size of the SMR, an initial authenticity proof for use with an initial verification process for the SMR, and an alternate authenticity proof for use with a subsequent verification process for the SMR;

verify the SMR by generating SMR verification results using the initial authenticity proof for the initial verification process applied to the SMR, and then using the alternate authenticity proof for the subsequent verification process applied to the SMR; and apply a comprehensive system reaction for the secure boot request by the application subsystem based on the SMR verification result.

10. The data processing system of claim 9, where the first set of parameters comprises one or more verification failure sanctions to be applied to an application subsystem executing the boot-code from the SMR.

11. The data processing system of claim 10, where the security subsystem is configured to apply the comprehensive system reaction by releasing the application subsystem from reset to execute the boot-code stored at the SMR when the SMR verification results indicate the SMR has been verified.

12. The data processing system of claim 10, where the security subsystem is configured to apply the comprehensive system reaction by applying the one or more verification failure sanctions to the application subsystem when the SMR verification results indicate the SMR has not been verified.

13. The data processing system of claim 10, where the security subsystem is configured to apply the comprehensive system reaction by releasing the application subsystem from reset to execute the boot-code stored at the SMR based on the SMR verification results by applying the one or more verification failure sanctions to the application subsystem when the SMR verification results indicate the SMR has not been verified.

14. The data processing system of claim 9, where the security subsystem is configured to install the first set of parameters for the SMR by:

declaring the boot-code to be verified; and associating the boot-code with one or more application subsystems on the data processing SoC.

15. The data processing system of claim 9, where each subsequent verification process applied to the SMR is faster than the initial verification process applied to the SMR.

16. The data processing system of claim 9, where the security subsystem is configured to use a public-key cryptography verification process for the initial authenticity proof, and to not use a public-key cryptography verification process for the alternate authenticity proof.

17. A secure boot method for a computer with one or more application subsystems and a hardware security subsystem, the method comprising:

initializing the hardware security subsystem during bootup of a data processing system to verify a bootloader;

receiving a secure boot request at the hardware security subsystem from a first application sub system;

installing at the hardware security subsystem a first set of parameters for a secure memory region (SMR) where a boot-code is stored, where the first set of parameters comprises a starting address and size of the SMR, an initial authenticity proof for use with an initial verification process for the SMR, an alternate authenticity proof for use with a subsequent verification process for the SMR, and one or more verification failure sanctions to be applied to an application subsystem executing the boot-code from the SMR;

verifying the SMR, at the hardware security subsystem, to generate SMR verification results by using the initial authenticity proof for the initial verification process applied to the SMR, and by using the alternate authenticity proof for the subsequent verification process applied to the SMR; and generating, by the hardware security subsystem, a system reaction for the secure boot request based on the SMR verification results.

18. The secure boot method of claim 17, where generating the system reaction comprises apply the one or more verification failure sanctions to the application subsystem when the SMR verification results indicate the SMR has not been verified.

19. The secure boot method of claim 17, where each subsequent verification process applied to the SMR is faster than the initial verification process applied to the SMR.

20. The secure boot method of claim 17, where the initial authenticity proof uses a public-key cryptography verification process, and where the alternate authenticity proof does not use a public-key cryptography verification process.

* * * * *